Patented May 22, 1951

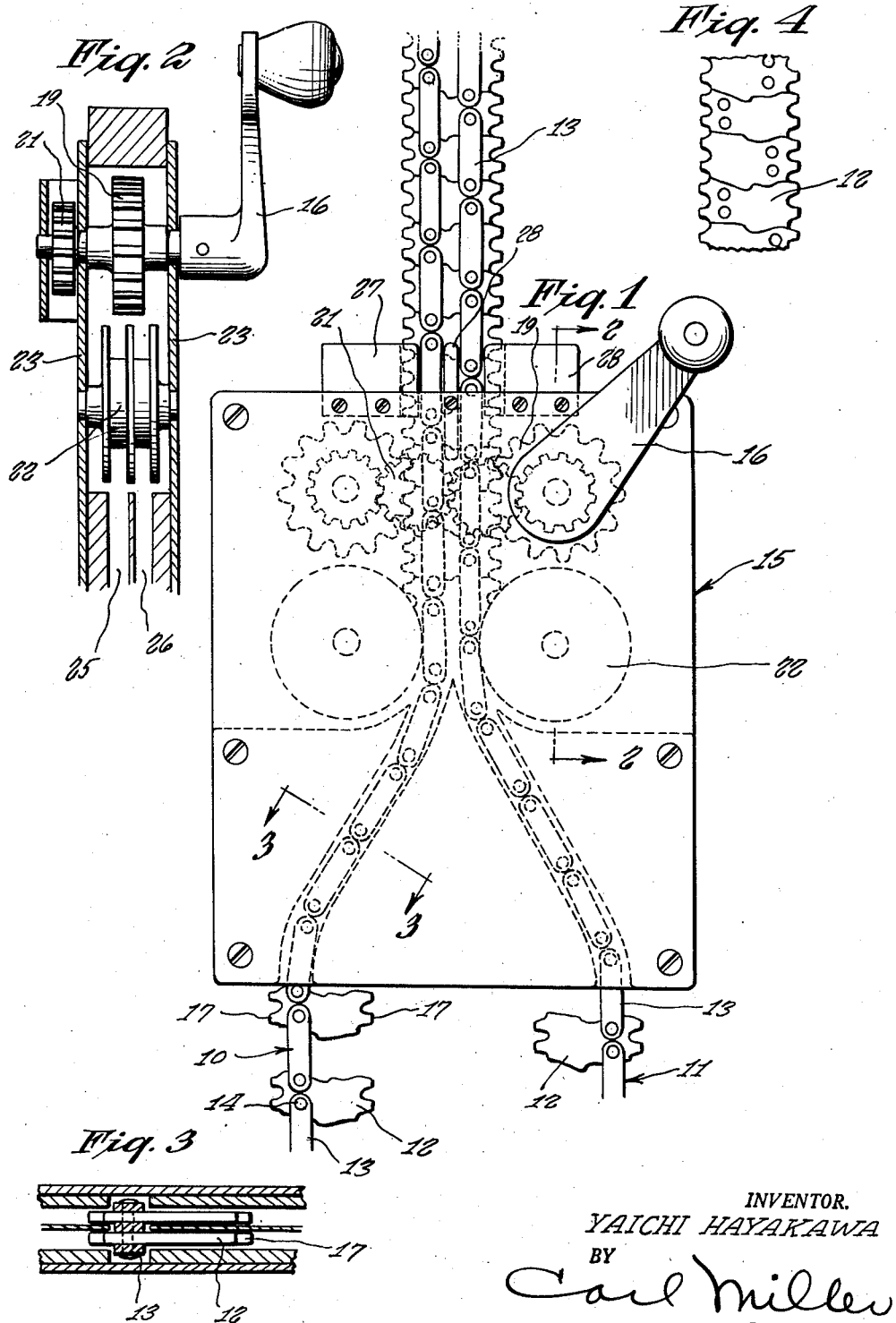

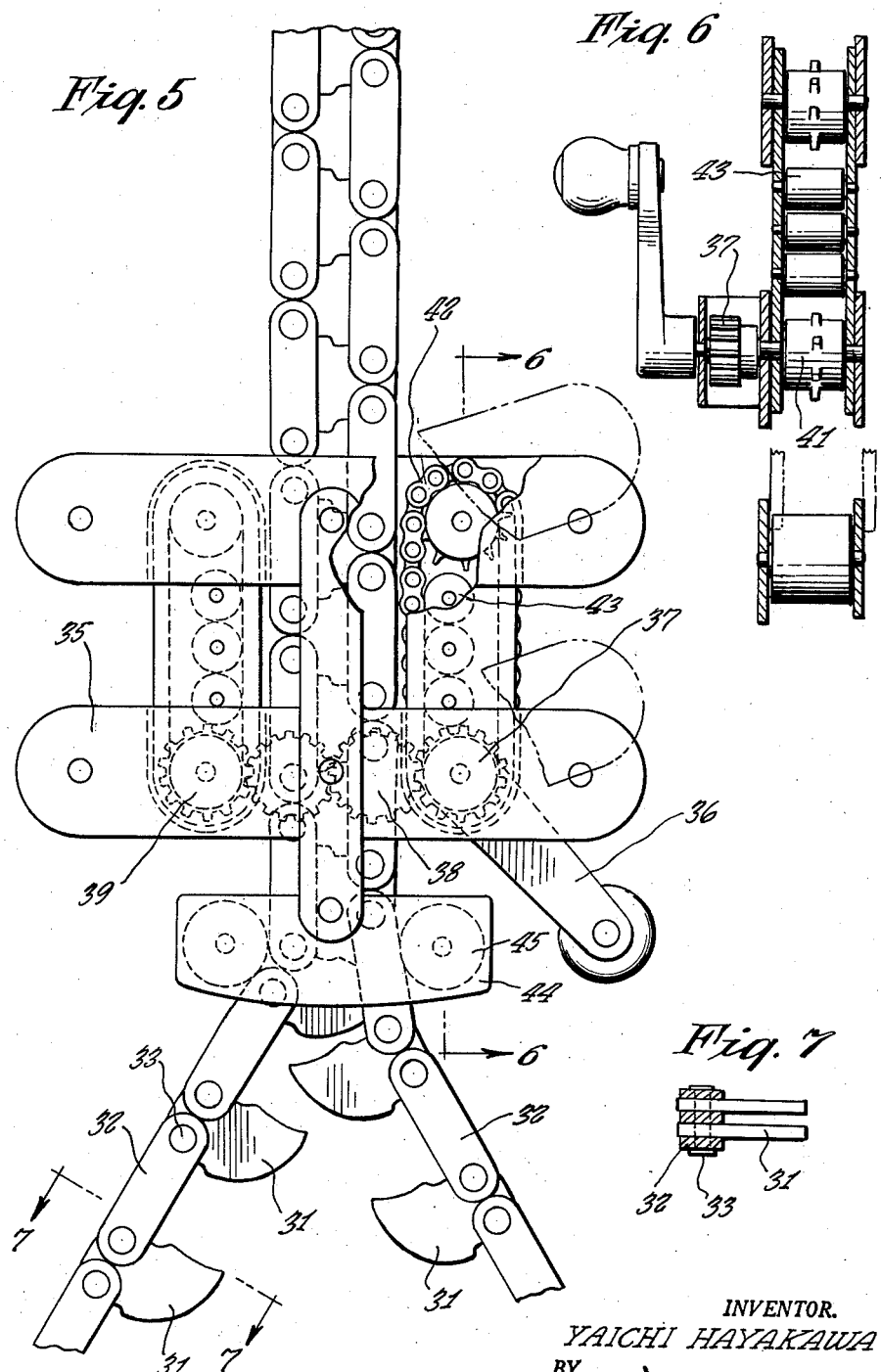

2,554,300

UNITED STATES PATENT OFFICE 2,554,300

INTERLOCKING CHAIN STANCHION

Yaichi Hayakawa, New York, N. Y.

Application August 29, 1947, Serial No. 771,323

1 Claim. (Cl. 189—34)

This invention relates to an industrial interlocking chain stanchion and to a device for effecting the union of the stanchion parts.

The principal object of this invention is to provide an interlocking action of two parallel chains at a pressure point to form a rigid stanchion.

It is an object of the present invention to provide an industrial chain stanchion wherein a member can be formed of separable stanchion parts by the union of the stanchion parts with a device which automatically as the same is operated will bring the parts into the proper relationship as in the case of an ordinary slide fastener, and such that the device is required for their separation and wherein by the use of chain parts constituting the stanchion elements, a solid and rigid member can be formed and thereafter disassembled to consume little space.

Another object of this invention is to effect means for hoisting or lifting, and pushing or pulling of objects, toward any desired direction, such as upwardly, downwardly or horizontal.

Other objects of the present invention are to provide an industrial chain stanchion wherein the parts are of simple construction, sturdy, of minimum number of parts, inexpensive to assemble and convenient to use.

For other objects and for a better understanding of the invention, reference may be had to the following detailed description taken in connection with the accompanying drawing, in which Fig. 1 is a plane view of the device and of the stanchion chains being extended through the device to be assembled into a rigid member.

Fig. 2 is a fragmentary cross-sectional view, in elevation, through the device and on line 2—2 of Fig. 1.

Fig. 3 is a fragmentary cross-sectional view taken on line 3—3 of Fig. 1.

Fig. 4 is a fragmentary view of several of the assembled lock parts of the stanchion chain elements.

Fig. 5 is a plan view of a modified form of stanchion chain and of a modified form of device for assembling the chain elements together.

Fig. 6 is a cross-sectional view taken through the assembly device shown in Fig. 5 and on line 6—6 thereof.

Fig. 7 is a transverse cross-sectional view taken through one of the chain elements shown in Fig. 5 and on line 7—7 thereof.

Referring now particularly to Figs. 1, 2, 3 and 4, 10 and 11 are respectively opposing chain elements including locking elements 12 adapted to be fitted together as shown in Fig. 4 to provide a rigid assembly of the chain elements and an integral and rigid member. The locking elements 12 are connected together in spaced relationship by means of chain links 13 located on opposite sides of the elements 12 and by pivot pins 14. In order to bring the chain elements 10 and 11 together into a locked relationship, there has been provided a device 15 which is operated by a hand crank 16. The locking parts 12 have gear teeth 17 on the opposite sides of the same adapted as the locking parts are gathered together to provide a continuous rack which will be propelled by gears 19 forming a part of the device 15 and which engage with the opposite sides of the elements. The motion imparted by the crank 16 is extended between the chain driving gears 19 by a set of four gears 21 disposed on the same shafts on which the gears 19 are disposed and intermediate thereof. The gears 19 will accordingly be rotated in a direction to pull the elements 10 and 11 over guide pulleys 22 located respectively at opposite sides of the chain elements and journalled between plates 23 of the device. The device 15 has guide ways 25 and 26 through which the chain elements 10 and 11 travel before reaching the guide pulleys 22. As the lock parts 12 arrive adjacent the pulley wheels from diverging directions, the locking elements 12 are drawn together so that their side edges match with one another to provide a solid strip. The elements 12 come in at an angle and fold into their respective positions between respective lock elements of the chains. When the elements have been finally assembled, they are guided from the device 15 as a rigid unit by guide members 27 and 28.

Referring now to Figs. 5, 6, and 7, there is shown a modified form of chain and a modified form of device for bringing the chain elements together. This chain zipper assembly is formed with lock parts 31 which are without gear formations on their ends. These locking parts 31 are connected together by chain links 32 and pivot pins 33. The edges of the parts 31 are formed to fit tightly together to provide a continuous strap. A device 35 is used to assemble the chain elements together. This device is provided with a crank 36 adapted to turn a gear 37 having a connection with intermediate gears 38 to effect the driving of a gear 39 at the opposite side of the device. These gears 37 and 39 are respectively connected to sprockets 41, Fig. 6, for driving chains 42. These chains are on opposite sides of the zipper elements and will press against the same to convey the chain zippers through the device. Rollers 43 will support the chains 42 intermediate their sprockets.

In order to bring the chain elements together, there is provided on the device 35 an extension 44 having rollers 45 adapted to draw inwardly the chain elements and the locking parts so that they fit together in the proper relationship to extend from the device a rigid and compact assembly. The rollers 45 guide the chain zipper parts and bring them together.

While various changes may be made in the detail construction, it shall be understood that such changes shall be within the spirit and scope of the present invention as defined by the appended claim.

Having thus set forth and described the nature of my invention, what is claimed is:

An industrial chain stanchion comprising chain stanchion elements locked together, each of said elements having locking parts and chain links separating the locking parts and pivotally connected thereto respectively on opposite sides of the locking parts, said locking parts of each stanchion element being spaced and receiving locking parts of opposing chain elements respectively thereby forming a continuous strap formation, and said locking parts having gear teeth on opposite ends of the same for the engagement with gear elements of an assembling apparatus serving to assemble the stanchion elements together.

YAICHI HAYAKAWA.

REFERENCES CITED

The following references are of record in the file of this patent:

UNITED STATES PATENTS

| Number | Name | Date |
|---|---|---|
| 799,163 | Hubbard | Sept. 12, 1905 |
| 1,925,194 | Long | Sept. 5, 1933 |

FOREIGN PATENTS

| Number | Country | Date |
|---|---|---|
| 418,690 | Great Britain | Oct. 30, 1934 |